US009213348B2

(12) United States Patent
Garrett et al.

(10) Patent No.: US 9,213,348 B2
(45) Date of Patent: Dec. 15, 2015

(54) METHOD AND SYSTEM FOR UTILIZING A BROADBAND GATEWAY FOR PEER TO PEER COMMUNICATIONS

(75) Inventors: David Garrett, Tustin, CA (US); Jeyhan Karaoguz, Irvine, CA (US); Xuemin Chen, San Diego, CA (US); Wael Diab, San Francisco, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 490 days.

(21) Appl. No.: 12/982,477

(22) Filed: Dec. 30, 2010

(65) Prior Publication Data

US 2011/0302248 A1 Dec. 8, 2011

Related U.S. Application Data

(60) Provisional application No. 61/351,696, filed on Jun. 4, 2010.

(51) Int. Cl.
*G06F 15/16* (2006.01)
*G06F 3/00* (2006.01)
(Continued)

(52) U.S. Cl.
CPC *G05F 1/66* (2013.01); *G05B 13/02* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.01); *H04L 47/2491* (2013.01); *H04L 63/0281* (2013.01); *H04L 63/10* (2013.01); *H04L 63/205* (2013.01); *H04L 65/102* (2013.01); *H04L 65/40* (2013.01); *H04L 67/10* (2013.01); *H04N 21/632* (2013.01); *H04W 12/08* (2013.01); *G06F 2221/07* (2013.01);
(Continued)

(58) Field of Classification Search
CPC ... H04L 65/4084; H04L 67/10; H04L 67/104; H04N 21/47202; H04N 21/632
USPC .......................................... 709/205; 715/753
See application file for complete search history.

(56) References Cited

U.S. PATENT DOCUMENTS 6,243,379 B1 * 6/2001 Veerina et al. ................ 370/389
2003/0158958 A1 * 8/2003 Chiu ............................. 709/231
(Continued)

*Primary Examiner* — Jeong S Park
(74) *Attorney, Agent, or Firm* — Foley & Lardner LLP; Christopher J. McKenna; Paul M. H. Pua

(57) ABSTRACT

A broadband gateway may be used to provide peer-to-peer communications with other broadband gateways. One or more peer-to-peer connections may be configured with each of the other broadband gateway, for use in peer-to-peer communications, which may be utilized to communicate shared content among the broadband gateways. Users may receive incentives for participating in peer-to-peer communications, comprising sharing credits and/or reduced charges. The broadband gateway may track and/or aggregate sharing credits based on communication of shared content. Peer-to-peer connections may be configured using at least one physical layer connection utilized by the broadband gateway in communicating with corresponding access network service provider. Peer-to-peer connections may also be configured using direct connections and/or links between the broadband gateways. The broadband gateway may generate a directory for use in conjunction with peer-to-peer operations. The directory may be presented via a user interface. The broadband gateway may generate and/or communicate peer-to-peer related alerts.

20 Claims, 8 Drawing Sheets

(51) Int. Cl.
| | |
|---|---|
| *G05F 1/66* | (2006.01) |
| *H04L 29/06* | (2006.01) |
| *H04W 12/08* | (2009.01) |
| *H04N 21/63* | (2011.01) |
| *G06Q 20/10* | (2012.01) |
| *H04L 12/857* | (2013.01) |
| *G06Q 30/02* | (2012.01) |
| *G06F 21/10* | (2013.01) |
| *G06Q 40/00* | (2012.01) |
| *G05B 13/02* | (2006.01) |
| *G06Q 30/04* | (2012.01) |
| *H04N 21/472* | (2011.01) |
| *H04L 29/08* | (2006.01) |
| *H04L 12/24* | (2006.01) |

(52) U.S. Cl.
CPC ............ *H04L41/32* (2013.01); *H04L 41/5019* (2013.01); *H04L 65/4084* (2013.01); *H04L 67/104* (2013.01); *H04N 21/47202* (2013.01)

(56) References Cited

U.S. PATENT DOCUMENTS

| | | | |
|---|---|---|---|
| 2005/0004995 A1* | 1/2005 | Stochosky | 709/219 |
| 2006/0107286 A1* | 5/2006 | Connor et al. | 725/31 |
| 2006/0224757 A1* | 10/2006 | Fang et al. | 709/231 |
| 2007/0061863 A1* | 3/2007 | Rajasekaran | 726/2 |
| 2007/0250880 A1* | 10/2007 | Hainline | 725/97 |
| 2007/0258396 A1* | 11/2007 | Tiraspolsky | 370/328 |
| 2008/0005345 A1* | 1/2008 | Roberts et al. | 709/230 |
| 2008/0222045 A1* | 9/2008 | Mukerji et al. | 705/59 |
| 2009/0125319 A1* | 5/2009 | Craine | 705/1 |
| 2010/0100911 A1* | 4/2010 | Ramakrishnan et al. | 725/92 |
| 2010/0161755 A1* | 6/2010 | Li et al. | 709/217 |

\* cited by examiner

METHOD AND SYSTEM FOR UTILIZING A BROADBAND GATEWAY FOR PEER TO PEER COMMUNICATIONS

CROSS-REFERENCE TO RELATED APPLICATIONS/INCORPORATION BY REFERENCE

This patent application makes reference to, claims priority to and claims benefit from U.S. Provisional Application Ser. No. 61/351,696 filed on Jun. 4, 2010. This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/984,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/381,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,733 filed on Dec. 30, 2010 even date herewith.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for utilizing a broadband gateway for peer to peer communications.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to encrypt broadcast signals communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a broadband gateway for peer to peer communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
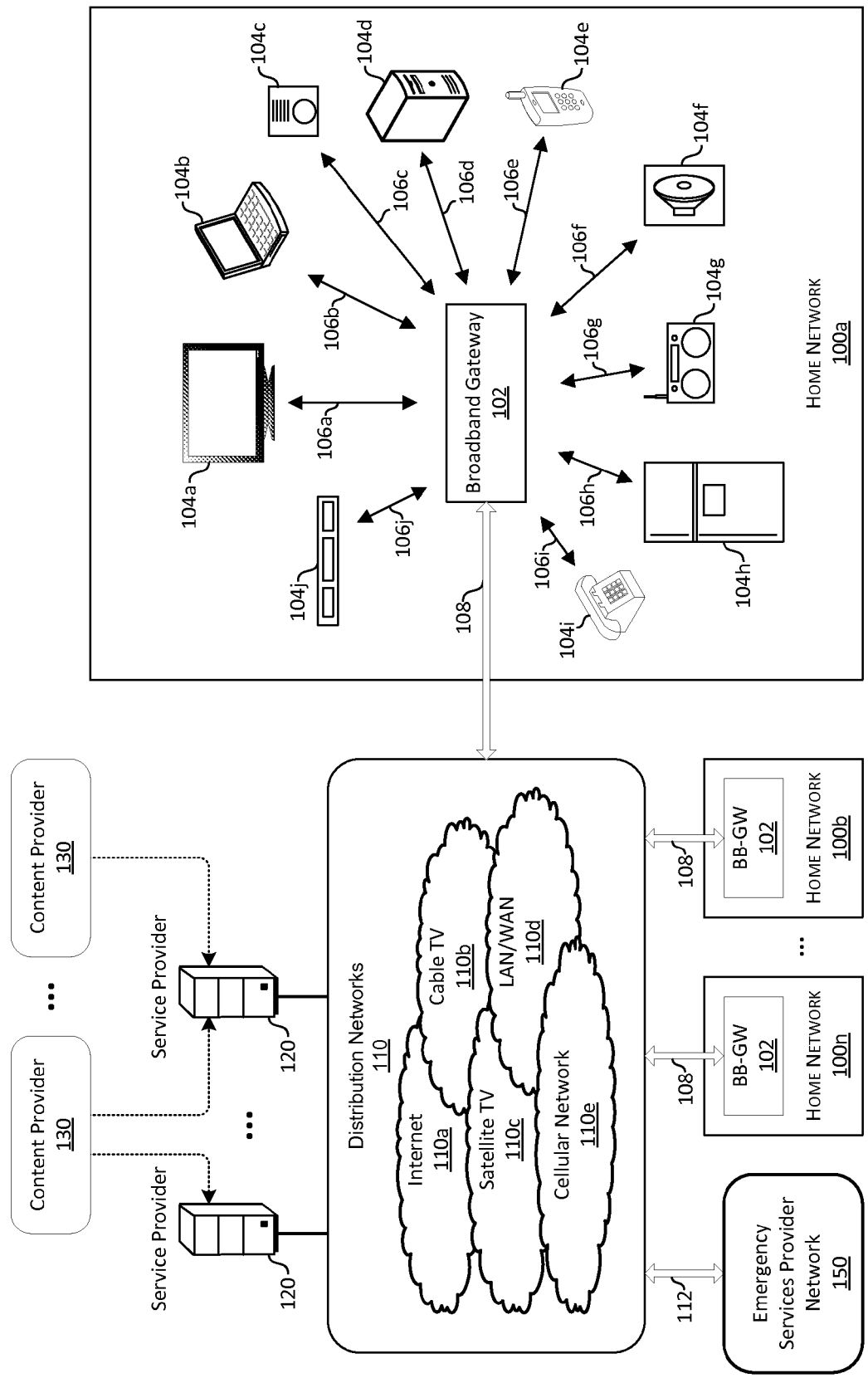
FIG. 1A is a block diagram illustrating an exemplary communication system that comprises a home network serviced by a broadband gateway, in accordance with an embodiment of the invention.

Certain embodiments of the invention may be found in a method and system for utilizing a broadband gateway for peer to peer communications. In various embodiments of the invention, a broadband gateway, which may be communicatively coupled to a plurality of devices in a home network, and/or which may be operable to handle one or more physical layer connections to corresponding one or more network access service providers, may be utilized to provide peer-to-peer communications with other broadband gateways, servicing other home networks. In this regard, the broadband gateway may configure one or more peer-to-peer connections to each of one or more of the other broadband gateway. The peer-to-peer connections may be configured based on, and/or using at least some of the one or more physical layer connections between the broadband gateway and corresponding network access service providers. The peer-to-peer connections may also be configured based on, and/or using direct connections and/or communication links between the broadband gateways. Configuration of the peer-to-peer connections may be initiated and/or performed based on user input. The broadband gateway may determine content that may be shared between the broadband gateways, and the sharable content may be communicated between broadband gateways using the configured peer-to-peer connections. Broadband gateway users may receive incentives for participating in peer-to-peer communications. The incentives may comprise payment or charge reductions, and/or sharing credits. The broadband gateway may track and/or aggregate charge reductions and/or sharing credits captured and/or claimed based on communication of shared content via peer-to-peer communications. The accumulated charge reductions and/or sharing credits may be applied to subsequent transactions via the broadband gateways.

The broadband gateway may store information associated with configured peer-to-peer connections, and/or with peer-to-peer connectivity and/or operations in general. The information may comprise, for example, data corresponding to available peers, existing and/or available connections, and/or available content, which may comprise sharable content. The information may be determined and/or generated directly by the broadband gateway, and/or based on data communicated to the broadband gateway by other broadband gateways and/or from providers. The broadband gateway may utilize a directory in conjunction with peer-to-peer operations. The directory may be generated based on the stored information, wherein the directory may be used for listing available peers, existing and/or available connections, and/or available content. The broadband gateway may generate peer-to-peer related alerts, which may then be communicated to the users. The broadband gateway may present a user interface, to enable interacting with users during peer-to-peer operations, and/or to facilitate communication via configured peer-to-peer connections. The user interface may be utilized for displaying the peer-to-peer directory.

FIG. 1A is a block diagram illustrating an exemplary communication system that comprises a home network serviced by a broadband gateway, in accordance with an embodiment of the invention. Referring to FIG. 1A, there is shown a home network 100a, a plurality of distribution networks 110, a plurality of service providers 120, and a plurality of content providers 130. The home network 100a may be serviced by a broadband gateway 102. Also shown in FIG. 1A are additional home networks 100b, . . . , 100n, and an emergency services provider network 150. Each of the home networks 100b, . . . , 100n may also be serviced by a broadband gateway 102.

The service providers 120 may comprise various entities which may provide various services to broadband gateways 102 and/or to devices serviced by the broadband gateways 102, such as the plurality of home devices 104a-104j. Some of the service providers 120 may comprise network access service providers which provide physical layer connections to the broadband gateway 102. Such physical layer connections may then be utilized to access content provided by the content providers 130, access services provided by other ones of the service providers 120, and/or access an intranet or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary embodiment of the invention, the broadband gateway 102 may enable connecting to multiple service providers 120 to facilitate receiving content originating from one or more of the content providers 130.

The content providers 130 may comprise various entities and/or networks which may generate, capture, and/or package content that may be distributed to end-users (i.e. "subscribers"), via the service providers 120 and/or the distribution networks 110. In this regard, content may comprise audio, video, multimedia, e-book, gaming, and/or other content. Exemplary content providers may comprise commercial providers of multimedia content, such as major film or television production and/or distribution companies (e.g. Paramount Pictures or Warner Bros.), and/or providers of personal content (e.g. user-generated content). The content may be, for example, downloadable and/or streaming, rented and/or purchased. Content originating from the content providers 130 may be distributed to the end-users (e.g. consumers) by the service providers 120. In some instances, content providers 120 and service providers 120 may be separate entities. In some instances, however, a single provider may provide both content and services. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the broadband gateways 102 via one or more physical connections provided by a network access service provider.

The plurality of distribution networks 110 may comprise one or more networks that may be operable to enable wireless and/or wired communication among a plurality of local and/or remote entities, based on one or more networking and/or communication infrastructures. In this regard, the plurality of distribution network 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, Internet 110*a*, the Cable Television (CATV) network 110*b*, Satellite Television (TV) network 110*c*, wireless local network area/wide network area (LAN/WAN) 110*d*, and/or cellular network 110*e*.

The Internet 110*a* may comprise a system of interconnected networks to enable exchange of data among a plurality of nodes, based on one or more networking standards, including, for example, the Internet Protocol (IP). The Internet 110*a* may enable connectivity among a plurality of private and public, academic, business, and/or government nodes and/or networks. The physical connectivity in the Internet 110*a* may be provided via, for example, the Public Switched Telephone Network (PSTN), copper wires, fiber-optic cables, wireless interfaces, and/or other protocols and/or standards-based interfaces. The transport functionality in the Internet 110*a* may be performed based on, for example, one or more transport protocols, such as the Transmission Control Protocol/IP (TCP/IP), for example. The CATV network 110*b* may comprise suitable distribution nodes, systems, and/or subnetworks that may enable forwarding of communication between CATV providers and a plurality of cable-TV consumers. For example, the CATV network 110*b* may comprise a network of fiber optics and/or coaxial cables for use in CATV broadcasts. The satellite TV network 110*c* may comprise suitable distribution nodes, systems, and/or subnetworks that may enable communication of satellite TV broadcast by satellite TV providers to a plurality of consumers. For example, the satellite network 110*c* may comprise a plurality of orbiting satellite nodes and/or one or more terrestrial centers in a satellite-TV system.

The LAN/WAN network 110*d* may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110*e* may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110*e* may comprise, for example, a plurality of control and/or switching nodes, and a plurality of base stations that enable transmission and/or reception of cellular based communications between the cellular network 110*e* and cellular capable devices.

Each of the home networks 100*a*-100*n* may correspond to a location that may comprise a plurality of devices, such as a plurality of home devices 104*a*-104*j* in the home network 100*a*, which may be serviced and/or managed by an instance of the broadband gateway 102. In this regard, the location may be a residence (e.g., home, apartment), a small business, a school, a library, and/or other like settings in which users may want to obtain access to service and/or to content provider networks. The broadband gateway 102 may be utilized in a home network, such as the home network 100*a*, to provide connectivity between the home network and one or more of the service providers 120 (and/or one or more of the content providers 130) via the distribution networks 110.

The broadband gateway 102 may comprise suitable logic, circuitry, interfaces, and/or code that may be operable to implement various aspects of the invention. In this regard, the broadband gateway 102 may be operable to communicate with the content providers 130, the service providers 120, and the plurality of home devices 104*a*-104*j*. In this manner, the broadband gateway 102 may enable bidirectional communication of content and/or other information between the content providers 130, the service providers 120 and the devices 104*a*-104*j*. Communications between the broadband gateway 102 and the content providers 130 and/or service providers 120 may be carried over optical, wired, and/or wireless links of the distribution network(s) 110. Similarly, Communications between the broadband gateway 102 and the devices 104*a*-104*j* may be carried over optical, wired, and/or wireless links. In an exemplary aspect of the invention, a single broadband gateway 102 may be operable to handle multiple physical layer (i.e., layer 1 of the open-systems interconnection model (OSI)) connections 108 to multiple ones, or portions, of the distribution network(s) 110, where different ones or portions of the distribution network(s) 110 may be owned, operated, leased, or otherwise associated with different ones of the network access service providers 120. For example, a first network access service provider may provide network access to the broadband gateway 102 via a DSL connection over twisted-pair cabling, and a second network access service provider may provide network access to the broadband gateway 102 via a cable television connection over coaxial cabling. In some instances, the broadband gateway 102 may be operable to concurrently communicate over the multiple physical layer connections provided by the multiple network access service providers.

The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers 130, wherein the content may be delivered through one or more services providers 120. For example, the broadband gateway 102 may be operable to perform such operations as network access related processing (e.g. PHY/MAC, and/or transport layer processing), encryption and/or decryption, user and/or account authentication, and/or at least some of video and/or audio processing operations which may be necessary for consumption of multimedia content.

The broadband gateway 102 may communicate with various devices in the home networks using optical, wired and/or wireless communication links. Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with the plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, an appliance 104h (e.g., refrigerator), a phone 104i, and a digital video recorder (DVR) or personal video recorder (PVR) 104j. The broadband gateway 102 may interact with each of the home devices 104a-104j via corresponding links 106a-106j, which may be supported by the broadband gateway 102 and the corresponding home device. For example, the link 106a between the broadband gateway 102 and the television 104a may comprise a High-Definition Multimedia Interface (HDMI) cable. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a wired or wireless link. The link 106i may comprise, for example, a phone line. The link 106j may comprise, for example, a wired or a wireless link.

The broadband gateway 102 may also be operable to provide and/or support various other, non-content related services in the home network 100a. For example, the broadband gateway 102 may be operable to provide energy management in the home network 100a, by controlling and/or adjusting configuration of one or more devices in the home network to reduce power consumption for example. The broadband gateway 102 may also provide emergency-related services in the home network 100a. For example, the emergency services provider network 150 may be connected to the distribution networks 110 via a link 112. The emergency services provider network 150 may be associated with one or more emergency service provider entities. For example, a public entity such as a 911 center and/or a private entity such as a security company may be able to interact with the broadband gateway 102 in the home network 100a via the distribution networks 110.

While the broadband gateway 102 is shown in FIG. 1A as a single and separate device, the invention need not be so limited. In one embodiment of the invention, the broadband gateway functionality may be implemented in a distributed manner over two or more devices. Furthermore, the broadband gateway may be implemented as a virtual platform, for example in instances where it may be implemented in distributed manner. In another embodiment of the invention, some or all of the functionality of the broadband gateway may be implemented within one of the televisions available in the home.

As illustrated in FIG. 1A, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations, may be possible by utilizing the broadband gateways 102 in the home networks. In this regard, the peer-to-peer communications may be utilized to enable, for example, communication of content via broadband gateways.

In operation, the broadband gateway 102 may be utilized as an interface device that may allow one or more service providers 120, content providers 130, and/or emergency service provider networks 150 to interact with various devices in a home network, such as in the home network 100a. In this regard, the broadband gateway 102 may support configuring and/or using the plurality of broadband connections 108. The broadband connections 108 may comprise optical, wired and/or wireless connections between the broadband gateway 102 and the distribution networks 110, to enable communication between the broadband gateway 102 and the service providers 120, content providers 130, and/or emergency service provider networks 150 for example. The broadband gateway 102 may be operable to perform and/or provide various services that may pertain to enabling and/or facilitating reception of data, such as multimedia content, for example, from one or more content providers, wherein the content may be delivered through one or more services providers. The broadband gateway 102 may distribute the received content to one or more devices in a home network, for consumption, and/or may perform, directly and/or indirectly using other devices, any processing and/or operations (e.g., decryption and/or account validation) that may be needed to ensure that the content may be consumed by the target home device(s).

The broadband gateway 102 may also provide and/or support various other services in the home network 100a beyond reception and/or download of content. For example, the broadband gateway 102 may be operable to provide energy management in the home network 100a, by controlling and/or adjusting configuration of one or more devices in the home network to reduce power consumption for example. The broadband gateway 102 may also provide emergency-related services in the home network 100*a*, including allowing first responders to provide alerts to a select group of users by accessing the broadband gateway 102 via secure links provided by the service/content providers.

In various embodiments of the invention described herein, the broadband gateway 102 may provide peer-to-peer communication. In this regard, the broadband gateways 102 in the home networks 100*a*, 100*b*, . . . , 100*n* may be operable to establish and/or configure connections between peers in associated home networks, which may be utilized to communicate content and/or messages between the peers. The peer-to-peer connections may be established and/or configured through the distribution networks 110. The peer-to-peer connections may also be configured and/or established without traversing the distribution networks 110, such as by utilizing direct connections between the broadband gateways. For example, the broadband gateways 102 in the home networks 100*a* and 100*b* may be operable to establish direct connections, which may comprise wired and/or wireless connections. The broadband gateway 102 may be operable to determine when/if peer-to-peer connections may be utilized, and/or which peers to interact with, in lieu of and/or in conjunction with interacting with service and/or content providers. In this regard, the broadband gateway 102 may select the peers based on various criteria, comprising, for example, connectivity related information, such as availability and/or type of connections between the broadband gateway 102 and the peers, and/or performance related parameters such as bandwidth, latency, reliability, and/or quality.

Service providers 120 and/or content providers 130 may provide incentive to subscribers engaging in peer-to-peer communications. In this regard, incentives may be offered to subscribers to encourage them to open their broadband gateways 102, to allow service providers 120 and/or content providers 130 to use the broadband gateways 102 as temporary storage and/or as distribution nodes for local areas within the distribution networks 110, and/or to enable using the broadband gateways 102 for sharing content via the peer-to-peer connections. The service providers 120 may incentivize establishment and/or use of peer-to-peer connections since use of such connections may reduce and/or optimize usage, load, and/or bandwidth of access networks of the service providers 120. In this regard, the reduction and/or optimization may result from reducing the amount of times the same content is communicated all the way from the service providers 120 to the various subscribers since the content may be communicated between the subscribers instead. The reduction and/or optimization may also result from use of shorter and/or more direct communication links within the distribution networks 110 during interactions between the peers, or from complete elimination of use of the distribution networks 110, such is when direct peer-to-peer connections are utilized. The incentives may comprise reduced payments or charges, and/or sharing discount credits/awards. In one embodiment of the invention, one or more of the service providers 120 and/or the content providers 130 may also manage at least a portion of peer-to-peer based interactions between the broadband gateways 102. In this regard, the service providers 120 and/or the content providers 130 may participate, for example, in establishing, configuring, and/or adjusting the peer-to-peer connections, based on network conditions for example. The service providers 120 and/or the content providers 130 may also provide information necessary for peer-to-peer operations, such as peer-to-peer connectivity and/or searching, finding, or exchanging of particular content using peer-to-peer connections. In this regard, the service providers 120 and/or the content providers 130 may provide, for example, centralized storage of peer-to-peer related data.

Figure 1B:
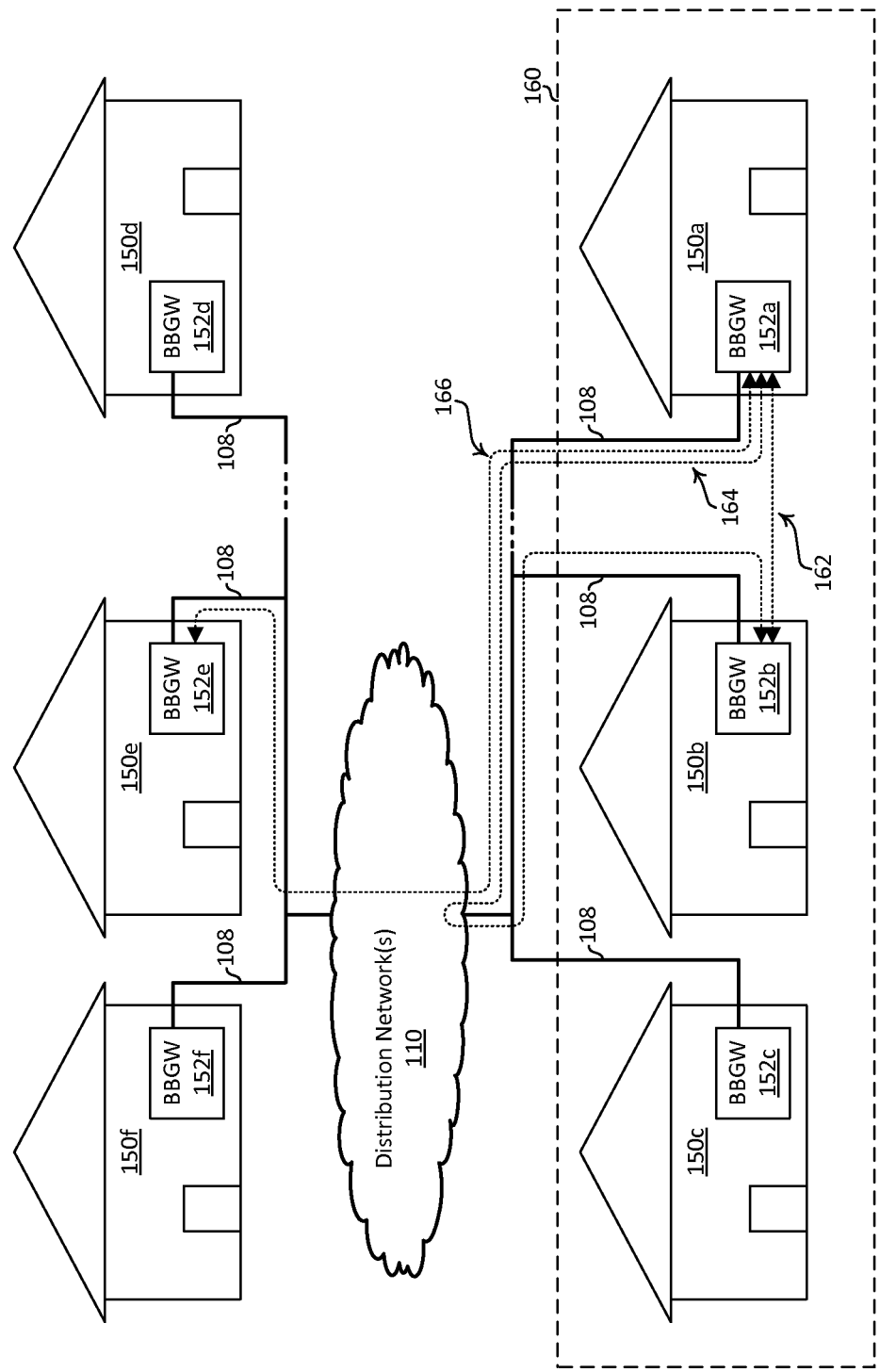
FIG. 1B is a block diagram illustrating an exemplary communication system comprising a plurality of broadband gateways that may be utilized for establishing peer-to-peer connections, between users in different home networks, in accordance with an embodiment of the invention.

FIG. 1B is a block diagram illustrating an exemplary communication system comprising a plurality of broadband gateways that may be utilized for establishing peer-to-peer connections, between users in different home networks, in accordance with an embodiment of the invention. Referring to FIG. 1B, there is shown a plurality of home networks 150*a*-150*f*, serviced by corresponding plurality of broadband gateways 152*a*-152*f*.

Each of the broadband gateways 152*a*-152*f* may be similar to the broadband gateway 102, substantially as described with regard to FIG. 1A. Each of the home networks 150*a*-150*f* may be similar to the home network 100*a*, substantially as described with regard to FIG. 1A. Accordingly, each of the home networks 150*a*-150*f* may comprise one or more home devices and/or one or more subscribers that may be serviced by the corresponding one of the broadband gateways 152*a*-150*f*. In this regard, each of the broadband gateways 152*a*-150*f* may utilize broadband connections 108 to access the distribution networks 110. Furthermore, in one embodiment of the invention, at least some of the home networks 150*a*-150*f* may be located in close proximity to each other, such as within the same neighborhood for example, as indicated by the dashed line 160.

In operation, the broadband gateways 152*a*-152*f* may be utilized to establish and/or utilize peer-to-peer connectivity between users serviced by the broadband gateways 152*a*-152*f*, in the associated home networks 150*a*-150*f*, substantially as described with regard to FIG. 1A. In this regard, the broadband gateways 152*a*-152*f* may adaptively and/or dynamically configure, manage, and/or utilize peer-to-peer connections. For example, the broadband gateways 150*a*-150*f* may be determine when peer-to-peer connections may be utilized, and/or which peers to interact with, for obtaining particular content for example, in lieu of and/or in conjunction with interacting with broadcast based providers. In this regard, the broadband gateways 152*a*-152*f* may select the best peer(s) based on various criteria, comprising, for example, connectivity related data, such as available connections, and/or corresponding communication parameters such as bandwidth, latency, reliability, and/or quality. This may be based on determination of the extent to which the peer-to-peer connections may need to traverse, and/or utilize access networks. For example, peer-to-peer connections established and/or configured among the broadband gateways 152*a*-152*f* may traverse the distribution networks 110, which may be accessed using the broadband connections 108 that may normally be utilized by the broadband gateways 152*a*-152*f* to interact with associated service providers. Thus, the broadband gateways 152*a*-152*f* may determine the extent to which the peer-to-peer connections may need to traverse the distribution networks 110, and/or configure and/or utilize these peer-to-peer connections accordingly. For example, peer-to-peer connection 166 between broadband gateways 152*a* and 152*e* may comprise substantial traversal and/or usage of the distribution networks 110. This may comprise, for example, traversing and/or utilizing multiple or different types of networks, such as the LAN/WAN 110*d* and the cellular network 110*e* for example. On the hand, broadband gateways 152*a* and 152*b* may be operable to establish peer-to-peer connection 164, which may require minimal traversing and/or use of the distribution networks 110. For example, the peer-to-peer connection 164 may utilize the Internet 110*a*, and may only run up to the first level of network switches above each of the broadband gateways 152*a* and 152*b*. In some instances, direct connections may be established and/or utilized between the broadband gateways. For example, the broadband gateways 152*a* and 152*b* may establish a direct peer-to-peer connection 162. In this regard, the peer-to-peer connection 162 may comprise, for example, a wireless personal area network (WPAN) connection, such as Bluetooth, ZigBee, or Ultra-wideband (UWB) connection; or a wireless local area network (WLAN), such as a WiFi (IEEE 802.11) connection.

In one exemplary embodiment, the broadband gateways 152*a*-152*f* may adaptively utilize multiplexing during peer-to-peer interactions. For example, rather than selecting only one of connections 162 and 164 between the broadband gateways 152*a* and 152*b*, the broadband gateways 152*a* and 152*b* may determine that may be more optimal to multiplex peer-to-peer interactions over both peer-to-peer connections. For example, broadband gateways 152*a* and 152*b* may multiplex peer-to-peer communication between them over connections 162 and 164 at 35% and 65%, respectively.

The peer-to-peer connections may be utilized for various purposes. For example, ability to establish and/or utilize peer-to-peer connections may enable sharing content directly between users, and this may enable configuring broadband gateways, such as the broadband gateway 152*b*, to service as temporary storage and/or as distribution nodes for local areas, such as the local area 160. The shared content may comprise content received from content providers 130, through the service providers 120 for example. The shared content may also comprise user generated and/or edited content. With respect to content received from content and/or service providers, sharing the content may be authorized prior to downloading it, and/or after it has been downloaded and/or consumed within the home network. For example, when a request for content is sent to providers, the providers may inquire as whether the requesting user may be willing to share to requested content, and if so, the content may be marked as shared content. Alternatively, users may indicate, when requesting content, whether the requested content will be or will not be shared content. In this regard, content and/or service providers may apply different pricing based on whether the content will or will not be shared.

Use of peer-to-peer connections, such as one or more of the peer-to-peer connections 162, 164, and/or 166 for sharing content between broadband gateways may enable reducing usage and/or load of distribution networks 110. The number of times the same content is communicated, for example, by providers through the access networks all the way down to the broadband gateways may be reduced since that content may be communicated instead between the broadband gateway via peer-to-peer connection, which may comprise short links and/or may be established closer to the broadband gateways may enable reducing usage and/or load of the distribution networks 110. For example, the broadband gateway 152*b* may request a content that may have been previously provided to broadband gateway 152*a*. Therefore, instead of communicating the content from the provider all way down through the distribution networks 110, the content may be communicated instead from broadband gateway 152*a* to broadband gateway 152*b* via peer-to-peer connection 162 to reduce load and/or usage of distribution network 110. Accordingly, compensation comprising a reduced price, and/or sharing discount credits/awards, may be used in conjunction with sharable content. The compensation comprising the reduced prices, and/or the sharing credits/awards may be captured and/or claimed by the sending subscriber and/or the receiving subscriber. For example, whereas the regular price of downloading a movie may be $4.99, a lower price, such as $3.99, maybe assessed if the receiving user assents to sharing the downloaded movie with other nearby users, wherein the movie may be communicated to those other users via peer-to-peer connections. In this regard, the reduced price of $3.99 may be assessed against the receiving user and the other users may get the movie from the first user.

Security measures and/or procedures may be utilized to protect data communicated during peer-to-peer communication, such as to guard against unauthorized sharing of copyrighted content for example. In this regard, encryption and/or decryption protocols and/or algorithms may be utilized to authenticate and/or ensure validity of content communications via peer-to-peer connections. Broadband gateways 152*a*-152*f* may, for example, select applicable encryption/decryption algorithm, and/or may communicate and/or specify ciphering keys that may be applied to the communicated content. In some instance, where content may already incorporate security measures, such as when content received from the content and/or the service provider incorporates digital right management (DRM), the content may be communicated utilizing DRM. Accordingly, the peers requesting and/or receiving any such content from other nearby peers may obtain the necessary authorization and/or DRM data, from service and/or content providers, before consuming and/or utilizing that content.

In one exemplary embodiment of the invention, the broadband gateways 152*a*-152*f* may be operable to generate, and/or to communicate peer-to-peer connectivity related alerts to users associated with these broadband gateways. These alerts may comprise information pertaining, availability of and/or changes to peer-to-peer connections, and/or to data that may be communicated via these peer-to-peer connections, such as multimedia content for example.

In one exemplary embodiment of the invention, directories may be utilized in conjunction with peer-to-peer interactions. For example, the broadband gateways 152*a*-152*f* may be operable to generate and/or utilize directories, which users may utilize during peer-to-peer activities. The directories may be displayed via user interfaces, which may be displayed via suitable video devices, such as a television or monitor for example. The directories may be utilized to communicate to users various peer-to-peer related information, comprising, for example, a listing of discovered peers, a listing communication links and/or interfaces that may be utilized in configuring and/or establishing, and/or information pertaining to content that may shared during peer-to-peer connections. In this regard, information presented and/or utilized by the directories may be based on data provided by and/or available directly within broadband gateways. The directory information may also be based on data obtained from the providers. For example, with regard to content, service providers may communicate data pertaining to availability of shared content in their networks. In this regard, the service providers may maintain a database which may indicate, for example, location of available content, and may communicate information based on that database to broadband gateways requesting particular content to enable the requesting user to select, optionally for example, that content from a nearby user with whom peer-to-peer connections may be established.

Figure 2:
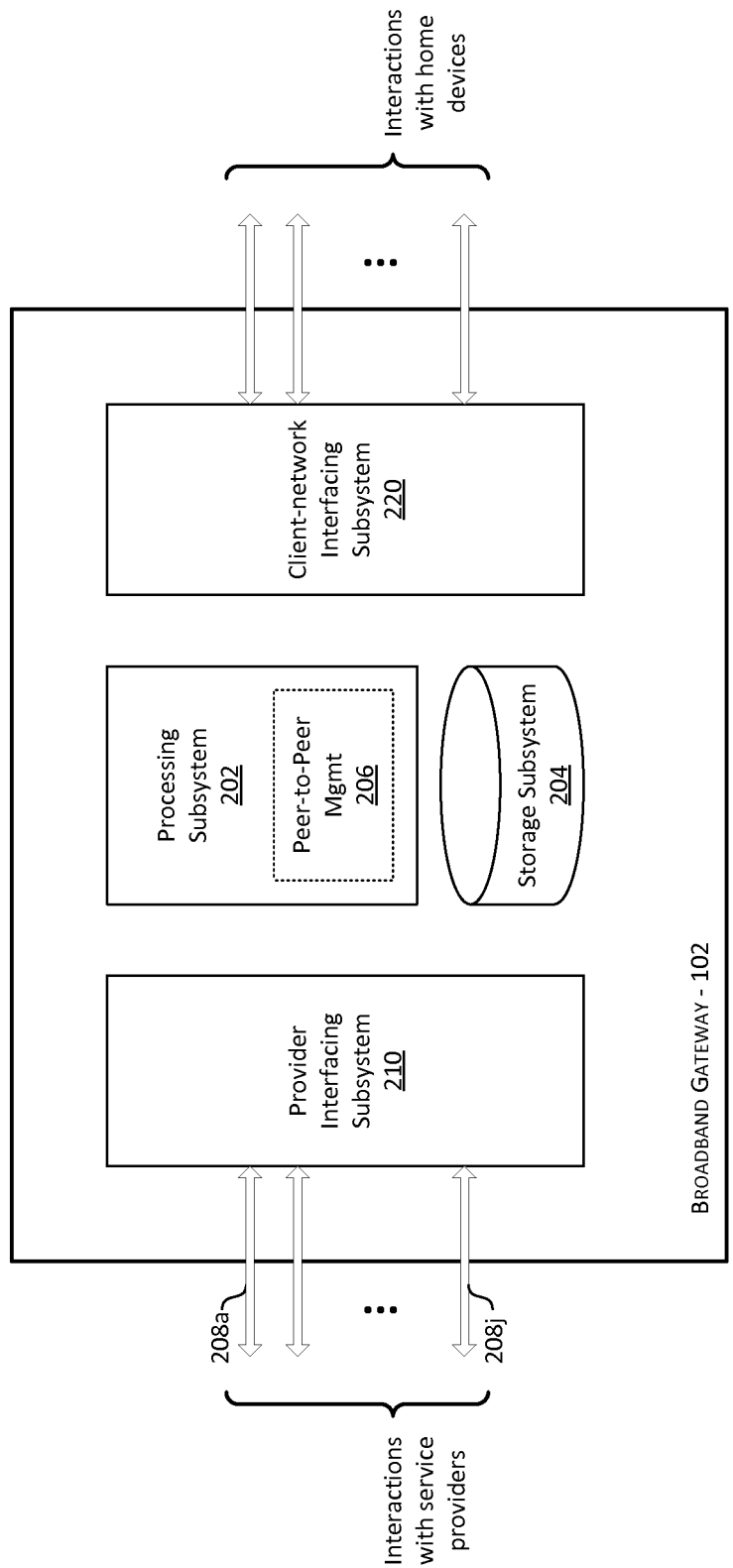
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, there is shown a broadband gateway 200 that may be substantially similar to the broadband gateway 102 described above with respect to FIG. 1A, and/or each of the broadband gateways 152*e*-152*f* of FIG. 1B.

The broadband gateway 200 may comprise suitable logic, circuitry, code, and/or interfaces that may be operable to provide connectivity between one or more external networks, such as the distribution networks 110 shown in FIG. 1A, for example, and one or more devices in a home network, such as the home devices 104a-104j in the home network 100a shown in FIG. 1A. In this regard, the broadband gateway 200 may operate as an interface device that allows one or more service providers 120, content providers 130, and/or emergency service providers 150, to interact with various devices in a home network serviced by the broadband gateway 200, and/or among the home devices themselves within the serviced home network.

The broadband gateway 200 may interact with serviced devices in a home network, such as the home network 100a, via wired and/or wireless communication links, to support communicating between the broadband gateway 200 and the home devices, and/or among the home devices via the broadband gateway 200. In this regard, the broadband gateway 200 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 200 may communicate with the various devices in the home via more than one home network.

The broadband gateway 200 may comprise a plurality of modules, each of which may comprise hardware, software, or a combination thereof that may be utilized to perform various operations associated with the broadband gateway 200. For example, in an embodiment of the invention, shown in FIG. 2, the broadband gateway 200 may comprise a processing subsystem 202, a storage subsystem 204, a provider interfacing subsystem 210, and a client-network interfacing subsystem 220. In some instances, the broadband gateway 200 may be such that the various modules listed above may be distributed over multiple devices. Moreover, the modules listed above are provided by way of illustration and not of limitation. Other configurations and/or architectures of the broadband gateway 200 may be implemented. For example, the broadband gateway 200 may be a virtual gateway setup in a network by utilizing virtual machines (VMs) and/or next-generation (NG) data centers.

The processing subsystem 202 may comprise suitable logic, circuitry, interfaces, and/or code that may be operable to process data received from the service and/or content providers and/or data received from one or more devices in the home network 100a. In this regard, the processing subsystem 202 may comprise one or more portions that are suitable to handle certain types of data such as video data and/or audio data, for example. The processing subsystem 202 may also be operable to control and/or manage operations of the broadband gateway 200, and/or performing tasks and/or applications therein. For example, the processing subsystem 202 may enable execution of applications, programs and/or code, which may be stored in the storage subsystem 204 for example. In this regard, the processing subsystem 202 may be operable to configure and/or control operations of various components and/or subsystems of the broadband gateway 200, and/or other devices managed by and/or connected to broadband gateway 200, by utilizing, for example, one or more control signals. The processing subsystem 202 may also control data transfers within the broadband gateway 200, in the course of performing various applications and/or tasks for example. The processing subsystem 202 may comprise, for example, a plurality of processors, which may be general and/or specialized processors (e.g. CPU, video processors, and/or audio processors). While the processing subsystem 202 is shown herein as a single block, the invention needs not be so limited. Accordingly, in instances where the broadband gateway 200 is implemented a distributed platform, some of the operations and/or functions described herein with regard to the processing subsystem 202 may be performed by different components that may be located in different devices. In an exemplary aspect of the invention, the processing subsystem 202 may comprise a peer-to-peer (P2P) management block 206, which may be utilized to manage and/or control peer-to-peer connections supported and/or established via the broadband gateway 200, substantially as described with regard to FIGS. 1A and 1B. While the P2P management block 206 is shown as a component of the broadband gateway 200, the invention need be so limited. In this regard, at least some of the functionality described herein with regard to the P2P management block may be performed by components and/or devices external to the broadband gateway 200, within home network serviced by the broadband gateway 200 and/or outside of it.

The storage subsystem 204 may comprise suitable logic, circuitry, interfaces, and/or code that may be operable to store data utilized in the operations of the broadband gateway 200. In this regard, the storage subsystem 204 may comprise one or more memory devices that may enable permanent and/or non-permanent storage, buffering, and/or fetching of data, code and/or other information which may be used, consumed, and/or handled in the broadband gateway 200. For example, the storage subsystem 204 may be utilized to store configuration data, parameters, device information, tracking and/or monitoring information, security information, and intermediate processing data, for example. The storage subsystem 204 may comprise storage media integrated in the broadband gateway 200 and/or one or more removable storage devices. The storage subsystem 204 may comprise different memory technologies, including, for example, read-only memory (ROM), random access memory (RAM), and/or Flash memory.

The provider interfacing subsystem 210 may comprise suitable logic, circuitry, interfaces, and/or code that may be operable to communicate data via one or more physical layer connections 208a-208j, to one or more corresponding network access service providers via the distribution networks 110 for example. The provider interfacing subsystem 210 may be operable to support multiple communication protocols, standards, and/or data transport technologies. In this regard, each of the physical layer connections 208a-208j may connect the gateway 200 to different network access service provider, and may comprise a wired, optical, or wireless connection. Each of the physical layer connections 208a-208j may utilize different physical media and/or different physical layer protocols. For example, the connection 208a may comprise a DSL over twisted-pair connection whereas and the connection 208j may comprise a CATV over coaxial cable connection. Accordingly, the provider interfacing subsystem 210 may enable accessing and/or communicating with one or more service providers 120 and/or content providers 120, via the distribution networks 110. The provider interfacing subsystem 210 may also be utilized to communicate data to and/or from third parties. In this regard, the provider interfacing subsystem 210 may enable gateway-to-gateway communication and/or interactions between the broadband gateway 200 and communication devices located outside the home network 100a, directly and/or indirectly through distribution networks corresponding to one or more service providers.

The provider interfacing subsystem 210 may enable concurrently communicating with multiple and/or different service/content providers and/or devices.

The client-network interfacing subsystem 220 may comprise suitable logic, circuitry, interfaces, and/or code that may be operable to send data to one or more devices in the home network serviced and/or managed by the broadband gateway, such as the home network 100a. The client-network interfacing subsystem 220 may also be operable to receive data from one or more devices in the home network 100a. The client-network interfacing subsystem 220 may be operable to support multiple communication protocols, standards, and/or data transport technologies. For example, the client-network interfacing subsystem 220 may support the links 106a-106j.

In operation, the broadband gateway 200 may be utilized as an interface device that may interact with a plurality of devices in a home network, such as such as the devices 104a-104j in the home network 100a, and/or may provide connectivity between the devices in the home network and service and/or content providers. The broadband gateway 200 may also interact with a plurality of home devices in a home network, such as the devices 104a-104j in the home network 100a, using the client-network interfacing subsystem 220. In this regard, the client-network interfacing subsystem 220 may support use of one or more of the links 106a-106j. Furthermore, the broadband gateway 200 may interact with one or more service providers 120 via the provider interfacing subsystem 210, to enable exchanging messages and/or content for example, via one or more of the distribution networks 110. Accordingly, the broadband gateway 200 may enable and/or facilitate obtaining content (e.g. multimedia content) from one or more content providers 130, wherein the content may be delivered through one or more services providers 120. The broadband gateway 200 may distribute the received content to one or more of the plurality of home devices 104a-104j, for content consumption, and/or may perform, directly via the processing subsystem 202 and/or indirectly utilizing other devices communicatively coupled to the broadband gateway 200, any processing and/or procedures (e.g. decryption and/or account validation) that may be necessary to ensure that the content may be consumed by the home device(s).

The broadband gateway 200 may also provide various services and/or tasks beyond, in addition to, and/or in conjunction with content delivery to home devices. For example, the broadband gateway 200 may perform content search, transport discovery, ranking, and/or sorting. These operations may be performed based on content quality, price, quality-of-service (QoS), and network protocols supported by the devices in the home network, such as service level agreements (SLAs), for example.

The broadband gateway 200 may provide user interface services in the home network. In this regard, the broadband gateway 200 may be operable to support user interfaces, and/or to generate and/or store data corresponding thereto, which may be utilized to enable interactions between the broadband gateway 200 and users, such as in the home network 100a for example. Exemplary user interfaces may comprise graphic user interfaces (GUIs), which may enable visually displaying and/or providing interaction with users, to provide visual interaction with customized content for example. Information inputted and/or outputted using the user interfaces may be stored in the broadband gateway 200, via the storage subsystem 204 for example. The user interfaces may enable configuring the broadband gateway 200, and/or any applications and/or services provided thereby, and/or may also be utilized to configure and/or adjust other devices in the home network 100a. GUIs, and like interfaces, may be displayed using one or more devices coupled to the broadband gateway 200. For example, interfaces generated and/or used by the broadband gateway 200 may be displayed using the television 104a.

The broadband gateway 200 may also be utilized to create, maintain, and/or update a plurality of profiles corresponding to users, devices, and/or services available in the home network 100a. Furthermore, user interfaces supported and/or used by the broadband gateway 200 may be utilized to enable displaying and/or modifying user, device, and/or service profiles. Data corresponding to these profiles may be stored in the storage subsystem 204 of the broadband gateway 200. For example, device-profiles may be utilized to store information associated with particular devices that may be coupled to and/or serviced by the broadband gateway 200. In this regard, device-profiles may be utilized for storage of information pertaining to device capabilities, limitations, requirements, and/or configuration parameters therefor. User-profiles may be utilize to store information associated with particular users, such as setting preferences for various devices and/or services that may be utilized by a particular user in conjunction with the broadband gateway 200. The broadband gateway 200 may utilize user and/or home device profile information to, for example, select layered video service(s) and/or transmission. In some instances, the programming and/or enhanced video layers received by the broadband gateway 200 may be aggregated midstream by one or more network or routing nodes.

The broadband gateway 200 may be operable to run or execute an agent to extract content, rating, copyright, language, privacy rules, and automatically add user generated content, for example. Such agent may be run or executed in connection with the processing subsystem 202 of the broadband gateway 200, for example. In some instances, the broadband gateway 200 may be operable to provide rating-related information or channel prediction to a service/content provider to assist with fast channel change. Furthermore, the broadband gateway 200 may be operable to combine and/or blend multiple contents for use as single content in the home network. Such combination may be performed in one or more of the modules of the broadband gateway 200. For example, the broadband gateway 200 may blend different video and audio contents for an event by accessing one or more service/content providers and providing automatic and/or manual content synchronization.

The broadband gateway 200 may be utilized in connection with constrained network resources, such as time of day, traffic congestion, and the like, for example, to provide incentives for a user to accept a lower cost, lower quality of service that is dynamically configured for current network conditions. In some instances, the broadband gateway 200 may allow enhanced low latency service delivery to client devices in a home network. Furthermore, bandwidth optimization by, for example, placing future requests for bandwidth to a service/content provider and accepting the best timeslots provided in return may be enabled by the broadband gateway 200.

The protection, management, and/or tracking of confidential data, such as health and financial records, for example, by tagging the data may be provided by the broadband gateway 200. Only when a user authorizes the transfer of the confidential data will such data be stored and/or aggregated. The broadband gateway 200 may be operable to create a trusted rating mechanism for content. The broadband gateway 200 may be secure against external threats that may be downloaded from outside the home network and may provide a secure domain distribution in the home network. Automated and secured billing and payment services may also be provided by the broadband gateway 200. Moreover, the broadband gateway 200 may be operable to filter and/or block specific content or portions thereof, and may also be utilized to govern client content access, which may be based on controlled user profiles and/or authorization requests to one or more additional client devices.

The gateway functionality associated with a user, such as security features, preferences, applications, electronic programming guides (EPGs), and user profile, for example, may be ported from the broadband gateway 200 to one or more other broadband gateways 200 in other locations. In some instances, a visitor may be allowed access to their content outside their service/content provider service area by, for example, classifying the access level for different users and/or by providing limited access to content. Moreover, the broadband gateway 200 may allow multiple user interface software structures by, for example, standardizing an interface to service/content providers and devices in the home network.

The broadband gateway 200 may be operable to support, via the P2P management block 206 for example, peer-to-peer communications, which may enable interactions with other broadband gateways and/or between users in different home networks for example, substantially as described with regard to FIGS. 1A and 1B. The peer-to-peer communications may be utilized, for example, to allow enhanced content sharing in a service/content provider networks. In this regard, the broadband gateway 200 may be operable to perform various procedures in conjunction with peer-to-peer connections. For example, the P2P management block 206 in the broadband gateway 200 may determine available connections, such as one or more of the physical layer connections 208a-208j, which may be used during peer-to-peer communications. The P2P management block 206 may configure and/or establish, based on determined available physical layer connections 208a-208j, one or more peer-to-peer connections, to each of one or more available peers. The P2P management block 206 may continually monitor and/or track availability and/or operations of the physical layer connections 208a-208j, to enable reconfiguration and/or modification of existing peer-to-peer connections, and/or configuration and/or establishment of new peer-to-peer connections.

The broadband gateway 200 may manage, via the P2P management block 206, content sharing, and/or sharing related incentives that may be available to users engaging in peer-to-peer communications, based on communication of shared content for example. The broadband gateway 200 may also manage, via the P2P management block 206, security related procedures implemented in conjunction with, for example, communication of content during peer-to-peer communications, substantially as described with regard to FIG. 1B. Moreover, the broadband gateway 200 may be utilized to match the content coding to the service type being consumed by the user and to make the necessary allocations through the network with respect to peer-to-peer or conventional Internet programming or broadcast programming.

The broadband gateway 200 may also provide, via the P2P management block 206, a directory service that may be utilized in conjunction with peer-to-peer operations, substantially as described with regard to FIG. 1B. In this regard, the broadband gateway 200 may obtain peer-to-peer related information, from within serviced home networks via the client-network interfacing subsystem 220, and/or from service and/or content providers via the provider interfacing subsystem 210. The information may be stored into, and/or subsequently retrieved from the storage subsystem 204, for example.

Figure 3:
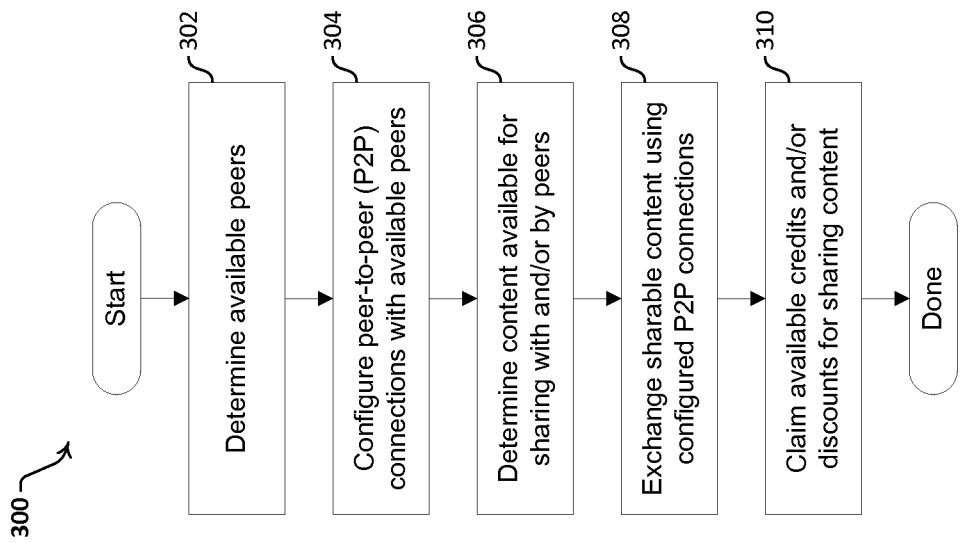
FIG. 3 is a flow chart that illustrates exemplary steps for utilizing the gateway to provide peer-to-peer communications, in accordance with an embodiment of the invention.

FIG. 3 is a flow chart that illustrates exemplary steps for utilizing the gateway to provide peer-to-peer communications, in accordance with an embodiment of the invention. Referring to FIG. 3, there is shown a flow chart 300 comprising a plurality of exemplary steps that may be performed to utilize the gateway to provide peer-to-peer communications extending outside a home network.

In step 304, available peers may be determined. For example, broadband gateway 200 may discover nearby broadband gateway, with home peer-to-peer connections may be established. In step 304, peer-to-peer (P2P) connections with available peers may be configured. For example, the broadband gateway 200 may configure one or more peer-to-peer connections, based on one or more of the physical layer connections 208a-208j, substantially as described with regard to FIG. 2. In step 306, content available for sharing with and/or by peers may be determined. In step 308, sharable content may be communicated between the peers using configured P2P connections. In step 310, available sharing credits and/or discounts, and/or payment reduction and/or adjustment for sharing content may be claimed and/or applied.

Figure 4A:
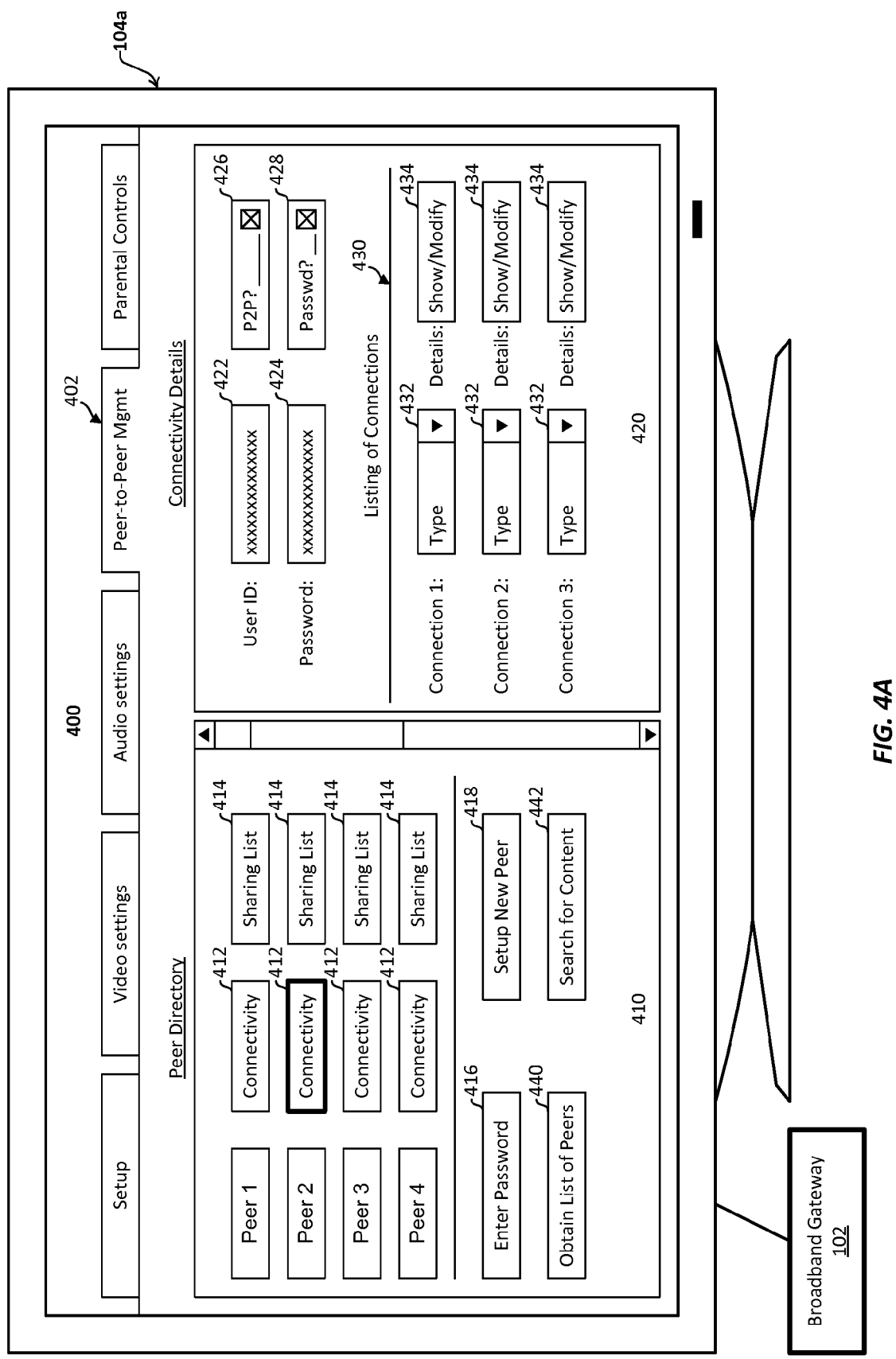
FIG. 4A is a block diagram illustrating an exemplary user interface generated by a broadband gateway for configuring peer-to-peer connections, in accordance with an embodiment of the invention.

FIG. 4A is a block diagram illustrating an exemplary user interface generated by a broadband gateway for configuring peer-to-peer connections, in accordance with an embodiment of the invention. Referring to FIG. 4A, there is shown a user interface 400.

The user interface 400 may, for example, be displayed as part of an on-screen display (OSD) and/or may be accessible via a "menu" button. The user interface 400 may be generated directly by the broadband gateway 102, and/or by other devices based on data provided by the broadband gateway 102, to enable interactions between the broadband gateway 102 and users associated with the broadband gateway 102, in the home network 100a for example. The user interface 400 may be displayed using a display device connected to the broadband gateway 102, such as the television 104a for example. In this regard, the link 106a may be utilized to communicate data and/or messages between the broadband gateway 102 and the television 104a, to enable communicating data that may be displayed using the user interface 400, and/or receiving user input, selection, and/or feedback which may be provided based on interactions with the user interface 400.

The exemplary user interface 400 may be utilized to enable users to setup the broadband gateway 102, and/or to control, configure and/or modify various applications and/or tasks, or aspects thereof, which may provided by the broadband gateway 102. In an exemplary aspect of the invention, the user interface 400 may incorporate a peer-to-peer (P2P) management function 402, which may be utilized to setup, configure, and/or manage a plurality of P2P connections associated with a user.

The P2P management function 402 may comprise, for example, frames 410 and 420. The frame 410 may display a peer directory associated with a specific user of the broadband gateway 102. The peer directory may comprise a listing of available peers. Associated with each peer entry may be two buttons 412 and 414. Upon selection or activation of button 412 by a user, by clicking on it for example, detailed information regarding connectivity for the corresponding peer may be displayed within the frame 420. This may comprise a listing of connections sub-frame 430 and/or various fields that may enable configuring and/or specifying general settings for a particular account. These general settings may comprise a user identifier (ID) field 422, a password field 424, a password enabling/disabling field 428 that maybe used by checking/un-checking an incorporated selection button, and a peer-to-peer activation/deactivation field 426 that maybe used by checking/un-checking an incorporated selection button. The listing of connections sub-frame 430 may lists available connections that may be utilized in conjunction with P2P communications. Associated with each connection entry may be two buttons 432 and 434. The button 432 may enable specifying the type of P2P connection, based on a listing of available physical layer connections, for example. Upon selection or activation of button 434 by a user, by clicking on it, for example, detailed information regarding associated P2P connection may be displayed, in a secondary frame (not shown), such as a pop-up frame for example. This may enable showing metrics related to the associated P2P connection, and/or may enable adjusting of configuration of the P2P connection, so as to allow multiplexing, for example. The button 414 may be utilized in conjunction with content sharing as described in more details in FIGS. 4B and 4C.

The frame 410 may also comprise a button 416 which may selected to enable entering one or more passwords before proceeding with any selection of buttons 412 or 414. In this regard, a user password may be required before displaying any of the detailed on frame 410. Accordingly, failure to provide the correct password may prevent displaying frame 420. The frame 410 may also comprise a button 418 which may be selected to enable setting up a new peer entry manually. Peer setup may be performed as a step-by-step procedure based on interactions using frame 420. The frame 410 may also comprise a button 440 which may be selected to enable obtaining and/or populating listing of peers by external entities, such as in instances where service and/or content provider may maintain at least a portion of peer-to-peer information and/or provide at least a portion of management of peer-to-peer interactions in their respective networks. The frame 410 may also comprise a button 442, which may be selected to enable searching for particular content, as described in more details in FIG. 4D.

Figure 4B:
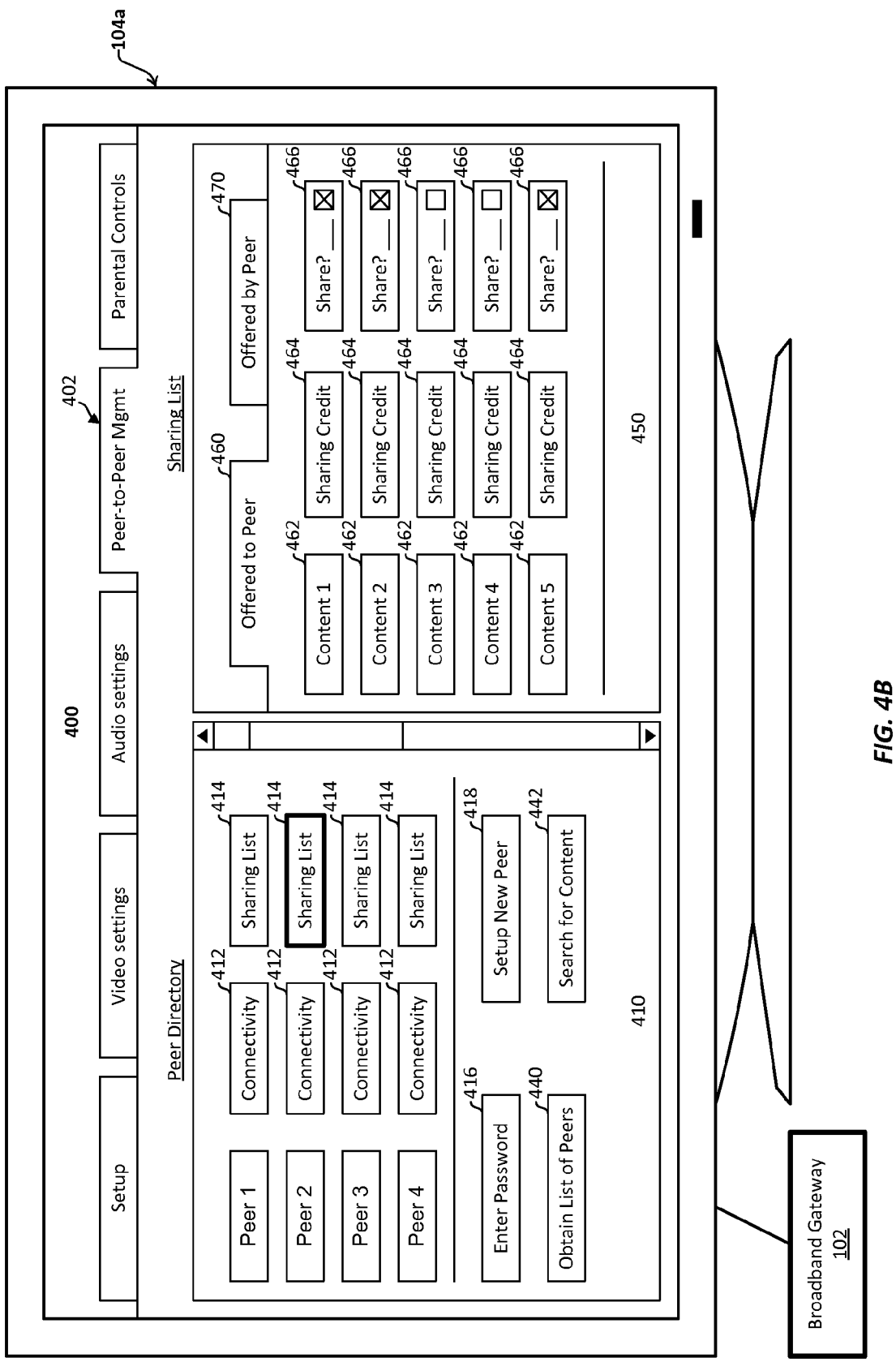
FIG. 4B is a block diagram illustrating an exemplary user interface generated by a broadband gateway for managing sharing of content with peers using configured peer-to-peer connections, in accordance with an embodiment of the invention.

FIG. 4B is a block diagram illustrating an exemplary user interface generated by a broadband gateway for managing sharing of content with peers using configured peer-to-peer connections, in accordance with an embodiment of the invention. Referring to FIG. 4B, there is shown the user interface 400 of FIG. 4A.

With reference to the P2P management function 402, as described with regard to FIG. 4A, upon selection or activation of button 414 by a user for a particular peer entry, by clicking on it for example, detailed information regarding content sharing for the corresponding peer may be displayed in the frame 450. This may comprise an "offered-to-peer" function 460 and an "offered-by-peer" function 470. Upon selection and/or activation of the offered-to-peer function 460, by clicking on it, for example, a listing of contents that may be offered to a particular peer may be shown. Associated with each content entry may be three buttons 462, 464 and 466. Upon selection or activation of button 462 by a user, by clicking on it for example, detailed information regarding the associated content may be displayed, in a secondary frame (not shown), such as a pop-up frame for example. This may comprise, for example, information indicating type of content (e.g. movie), and/or providing detailed profile therefor, such as listing of actors, director, and/or duration. Upon selection or activation of button 464 by a user, by clicking on it for example, information regarding sharing credits for the associated content may be displayed, in a secondary frame (not shown), such as a pop-up frame for example. This may comprise, for example, information pertaining to any payment reduction and/or sharing credits that may be provided for sharing the content with the associated peer. Enabling or disabling of sharing for the associated content may be specified by checking/un-checking the selection button 466.

Figure 4C:
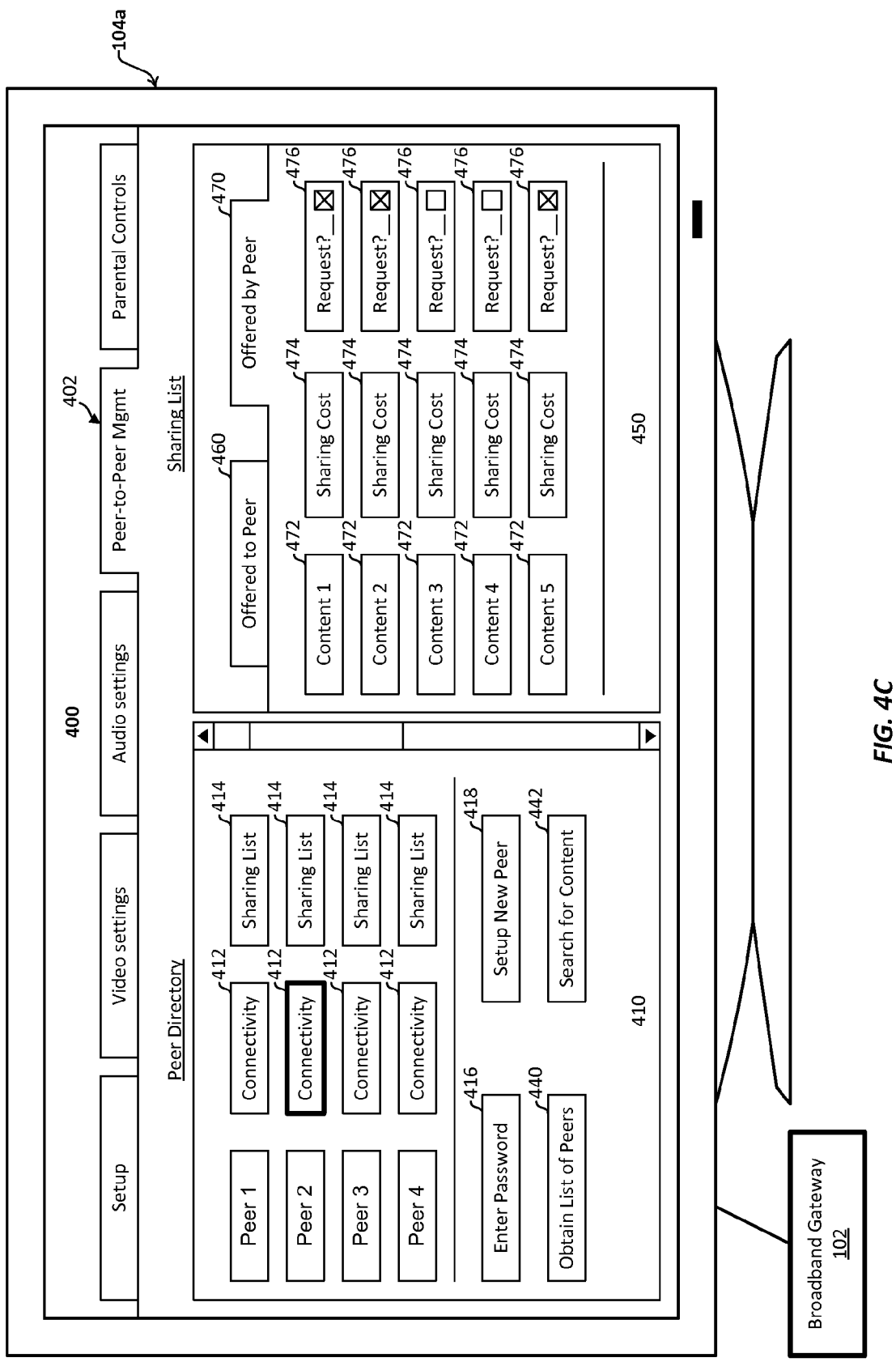
FIG. 4C is a block diagram illustrating an exemplary user interface generated by a broadband gateway for obtaining content from peers using configured peer-to-peer connections, in accordance with an embodiment of the invention.

FIG. 4C is a block diagram illustrating an exemplary user interface generated by a broadband gateway for obtaining content from peers using configured peer-to-peer connections, in accordance with an embodiment of the invention. Referring to FIG. 4B, there is shown the user interface 400 of FIG. 4A.

With reference to the sharing list of frame 450, as described with regard to FIG. 4B, upon selection or activation of the offered-by-peer function 470, by clicking on it for example, a listing of contents that may be obtained from a particular peer may be shown. Associated with each content entry may be three buttons 472, 474 and 476. Upon selection or activation of button 472 by a user, by clicking on it for example, detailed information regarding the associated content may be displayed, in a secondary frame (not shown), such as a pop-up frame for example. This may be similar to the outcome of selecting button 462 with respect to the offered-to-peer function 460. Upon selection or activation of button 474 by a user, by clicking on it for example, information regarding sharing costs for the associated content may be displayed, in a secondary frame (not shown), such as a pop-up frame for example. This may comprise, for example, information pertaining to costs of obtaining the associated content from the associated peer. In this regard, sharing costs may be actually comprise payment reduction compared to direct download from providers, and/or may incorporate sharing credits that may be provided obtaining the content with the associated peer. The content may be requested from the associated peer by checking or un-checking the selection button 476.

Figure 4D:
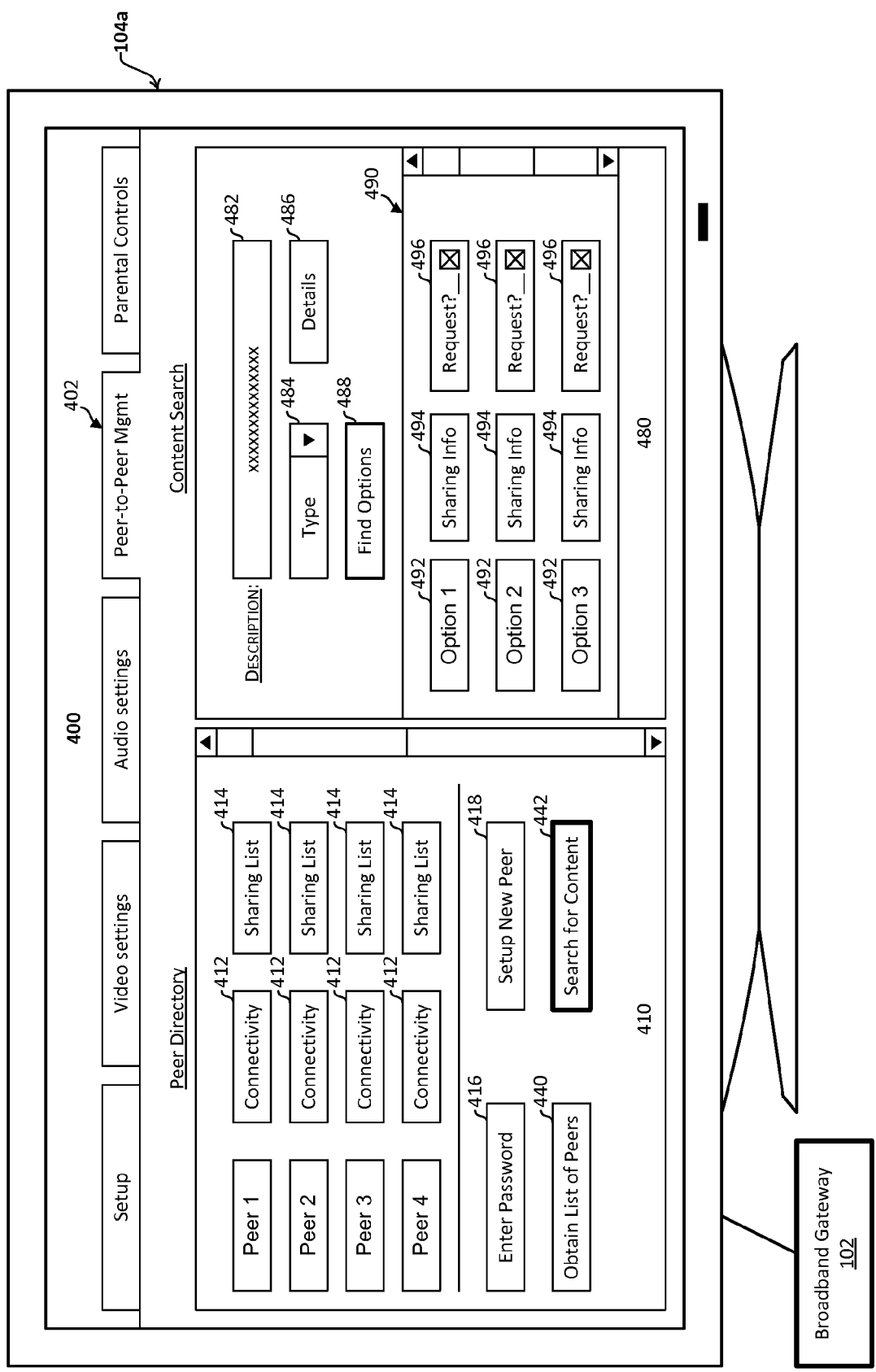
FIG. 4D is a block diagram illustrating an exemplary user interface generated by a broadband gateway for searching for content that can be obtained from peers, in accordance with an embodiment of the invention.

FIG. 4D is a block diagram illustrating an exemplary user interface generated by a broadband gateway for searching for content that can be obtained from peers, in accordance with an embodiment of the invention.

With reference to the P2P management function 402, as described with regard to FIG. 4A, search for particular content may be performed upon selection or activation of button 442 by a user. In this regard, the content search may be performed based on configured peers and/or by obtaining content related information from the networks, such from service and/or content providers. For example, when a user selects to search for particular content, by clicking on button 442 for example, a detailed "content search" interface may be displayed in frame 480. This may comprise a plurality of fields that may be utilized to configure the content search. For example, the frame 480 may comprise a description field 482, a type button 484, and details button 486. In this regard, a user may provide content related description in the description field 482. For example, the user may enter in the description field 482 a title of a particular movie, and/or key words relating thereto. The button 484 may enable specifying the type of content, such as movie, music, etc. Selection and/or activation of the button 486 by a user, by clicking on it for example, may enable viewing, configuring, and/or modifying detailed information regarding the desired content. In this regard, selecting button 486 may display a secondary frame (not shown), such as a pop-up frame for example, to enable the user to view, enter, and/or modify various content related information, which may comprise, for example, quality related parameters, such as compression and/or resolution in instance where the content may comprise a movie for example.

A search for available option to provide the content from peers may be generated and/or displayed, as a listing of options 490, upon selection and/or activation of the "find options" button 488. Associated with each content option may be three buttons 492, 494 and 496. Upon selection or activation of button 492 by a user, by clicking on it for example, detailed information regarding the corresponding peer option for obtaining the requested content may be displayed, in a secondary frame (not shown), such as a pop-up frame for example. This may comprise, for example, information indicating type peer-to-peer connection, and/or peer-to-peer connectivity performance related parameters, such as reliability, bandwidth, and/or latency. Upon selection or activation of button 494 by a user, by clicking on it for example, information regarding sharing related information associated with obtaining the content from the corresponding option may be displayed, in a secondary frame (not shown), such as a pop-up frame for example. This may comprise, for example, sharing costs and/or credits. The user may authorize obtaining the desired content from a particular option by checking/un-checking the selection button 496.

Various embodiments of the invention may comprise a method and system for utilizing a broadband gateway for peer to peer communications. The broadband gateway 200, which may correspond to the broadband gateway 152*a* for example, may be utilized to provide peer-to-peer communications with other broadband gateways, such as one or more of the broadband gateways 152*b*-152*f*. In this regard, the broadband gateway 200 may configure one or more peer-to-peer connections to one or more of the other broadband gateway 200. The peer-to-peer connections may be configured, via the P2P management block 206 for example, based on, and/or using at least some of the physical layer connections 208*a*-208*j* utilized in communicating with network access service providers. The peer-to-peer connections may also be configured based on, and/or using direct connections and/or links between the broadband gateway 200 and other broadband gateways. Configuring peer peer-to-peer connections may be initiated and/or performed based on user input provided and/or communicated to the broadband gateway 200, via the client-network interfacing subsystem 220 for example.

The broadband gateway 200 may determine content that may be shared by broadband gateways, and the sharable content may be communicated using the configured peer-to-peer connections. In this regard, the broadband gateway 200 may determine, via the P2P management block 206, the availability of incentives for participating in peer-to-peer communications. The incentives may comprise payment or charge reductions, and/or sharing credits. The broadband gateway 200 may track and/or aggregate, via the P2P management block 206, charge reductions and/or sharing credits captured and/or claimed based on communication of shared content via peer-to-peer communications. The accumulated charge reductions and/or sharing credits may be applied to subsequent transactions via the broadband gateway 200.

The broadband gateway 200 may store, using the storage subsystem 204 for example, information associated with configured peer-to-peer connections, and/or with peer-to-peer connectivity and/or operations in general. The information may correspond to, for example, available peers, existing and/or available connections, and/or available content, which may comprise sharable content. The information may be determined and/or generated directly by the broadband gateway 200, and/or based on data communicated to the broadband gateway 200 by other broadband gateway and/or from access network service providers. The broadband gateway 200 may utilize a peer-to-peer related directory in conjunction with peer-to-peer operations. The directory may be generated based on, for example, the stored information, wherein the directory is used for listing available peers, existing and/or available connections, and/or available content. The broadband gateway 200 may generate peer-to-peer related alerts, which may then be communicated to the users. The broadband gateway 200 may generate and/or present the user interface 400, which may enable interacting with users during peer-to-peer operations and/or facilitating communication via configured peer-to-peer connections. The user interface 400 may be utilized for displaying the peer-to-peer directory. The user interface 400 may also be utilized to configure and/or specify various aspects of peer-to-peer connections available via the broadband gateway 200.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing a broadband gateway for peer to peer communications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    in a broadband gateway communicatively coupled to a plurality of devices, wherein said broadband gateway is configured to handle at least one physical layer connection to at least one service or content provider:
    configuring one or more peer-to-peer connections between said broadband gateway and one or more other broadband gateways;

generating, by the broadband gateway, a directory comprising an identification of said one or more configured peer-to-peer connections, and information received from said at least one service or content provider on content located on said one or more other broadband gateways;

determining, using the generated directory, content that is sharable between said broadband gateway and said one or more other broadband gateways;

selecting, using the generated directory, a first peer-to-peer connection from said configured one or more peer-to-peer connections to obtain a first portion of said sharable content, and a second peer-to-peer connection to obtain a second portion of said sharable content, in lieu of interacting with said at least one service or content provider for said sharable content; and communicating said a first portion of said sharable content to said broadband gateway using said first peer-to-peer connection and communicating said second portion to said broadband gateway using said second peer-to-peer connection.

2. The method according to claim 1, comprising incentivizing a reduction in network access bandwidth used by said at least one service or content provider by configuring said one or more peer-to-peer connections.

3. The method according to claim 1, wherein said content located on said one or more other broadband gateways was previously obtained from said at least one service or content provider.

4. The method according to claim 1, wherein said directory includes information corresponding to at least one of available peers, existing connections, available connections, or sharable content.

5. The method according to claim 1, comprising presenting said directory on a user interface configured for listing at least one of available peers, existing connections, available connections, or sharable content.

6. The method according to claim 1, wherein said first portion and said second portion are communicated to said broadband gateway by multiplexing over said first peer-to-peer connection and said first peer-to-peer connection.

7. The method according to claim 1, comprising at least one of tracking or aggregating sharing credits based on communication of said sharable content.

8. The method according to claim 1, comprising generating one or more alerts to indicate changes in at least one of availability of said one or more peer-to-peer connections or availability of said sharable content.

9. A system, comprising:
one or more circuits, one or more processors, or any combination thereof for use in a broadband gateway communicatively coupled to a plurality of devices, wherein said broadband gateway is configured to handle at least one physical layer connection to at least one network access service provider, said one or more circuits, one or more processors, or any combination thereof being configured to:

configure one or more peer-to-peer connections between said broadband gateway and one or more other broadband gateways;

generate, by the broadband gateway, a directory comprising an identification of said one or more configured peer-to-peer connections, and information received from said at least one service or content provider on content located on said one or more other broadband gateways;

determine, using the generated directory, content that is sharable between said broadband gateway and said one or more other broadband gateways;

selecting, using the generated directory, a first peer-to-peer connection from said configured one or more peer-to-peer connections to obtain a first portion of said sharable content, and a second peer-to-peer connection to obtain a second portion of said sharable content, in lieu of interacting with said at least one service or content provider for said sharable content; and communicate said a first portion of said sharable content to said broadband gateway using said first peer-to-peer connection and communicating said second portion to said broadband gateway using said second peer-to-peer connection.

10. The system according to claim 9, wherein said one or more circuits, one or more processors, or any combination thereof is configured to incentivize a reduction in network access bandwidth used by said at least one service or content provider by configuring said one or more peer-to-peer connections.

11. The system according to claim 9, wherein said content located on said one or more other broadband gateways was previously obtained from said at least one service or content provider.

12. The system according to claim 9, wherein said directory includes information corresponding to at least one of available peers, existing connections, available connections, or sharable content.

13. The system according to claim 9, wherein said one or more circuits, one or more processors, or any combination thereof is configured to present said directory on a user interface configured for listing at least one of available peers, existing connections, available connections, or sharable content.

14. The system according to claim 9, wherein said one or more circuits, one or more processors, or any combination thereof is configured to present a user interface to facilitate communication via said one or more peer-to-peer connections.

15. The system according to claim 9, wherein said one or more circuits, one or more processors, or any combination thereof is configured to at least one of track or aggregate sharing credits based on communication of said sharable content.

16. The system according to claim 9, wherein said one or more circuits, one or more processors, or any combination thereof is configured to generate one or more alerts to indicate changes in at least one of availability of said one or more peer-to-peer connections or availability of said sharable content.

17. A method, comprising:
configuring one or more peer-to-peer connections between a broadband gateway and one or more other broadband gateways;

generating, by the broadband gateway, a directory comprising an identification of said one or more configured peer-to-peer connections, and information from at least one service or content provider on content located on said one or more other broadband gateways;

determining, using the generated directory, content that is sharable between said broadband gateway and said one or more other broadband gateways;

selecting, using the generated directory, a first peer-to-peer connection from said configured one or more peer-to-peer connections to obtain a first portion of said sharable content, and a second peer-to-peer connection to obtain a second portion of said sharable content, in lieu of interacting with said at least one service or content provider for said sharable content;

communicating said first portion to said broadband gateway using said first peer-to-peer connection and said second portion to said broadband gateway using said second peer-to-peer connection; and applying a reduction in price for obtaining said a first and second portions of said sharable content using said first and second peer-to-peer connections.

18. The method according to claim 17, further comprising:

in response to sending a request for content to said at least one service or content provider, receiving an inquiry from said at least one service or content provider as to whether said content will be sharable with said broadband gateway using said configured one or more peer-to-peer connections, to establish a reduced price for said content based on whether said content is sharable.

19. The method according to claim 17, further comprising:

in response to determining that said content is sharable with said broadband gateway using said configured one or more peer-to-peer connections, obtaining said content from said one or more other broadband gateways at a reduced price.

20. The method according to claim 17, further comprising incentivizing establishment of said one or more peer-to-peer connections.

\* \* \* \* \*